US008600729B2

(12) United States Patent
Yang et al.

(10) Patent No.: US 8,600,729 B2
(45) Date of Patent: Dec. 3, 2013

(54) METHOD AND SYSTEM FOR CO-OCCURRENCE-BASED TEXT CONVERSION

(75) Inventors: Ping-Che Yang, Kaohsiung (TW); Shih-Hung Wu, Taipei (TW); Tsun Ku, Taipei (TW); Chien-Hui Lin, Kaohsiung (TW); Chia-Ching Lu, Changhua County (TW); Wen-Tai Hsieh, Taipei (TW)

(73) Assignee: Institute for Information Industry, Taipei (TW)

( * ) Notice: Subject to any disclaimer, the term of this patent is extended or adjusted under 35 U.S.C. 154(b) by 376 days.

(21) Appl. No.: 12/963,608

(22) Filed: Dec. 8, 2010

(65) Prior Publication Data

US 2012/0109624 A1    May 3, 2012

(30) Foreign Application Priority Data

Nov. 3, 2010    (TW) ................................ 99137801 A (51) Int. Cl.
*G06F 17/28*    (2006.01)
(52) U.S. Cl.
USPC ...................................... 704/2; 704/3; 704/4
(58) Field of Classification Search
USPC .......................................................... 704/2–8
See application file for complete search history.

(56) References Cited

U.S. PATENT DOCUMENTS

| | | | | |
|---|---|---|---|---|
| 2002/0198701 | A1* | 12/2002 | Moore | 704/2 |
| 2004/0024581 | A1* | 2/2004 | Koehn et al. | 704/2 |

FOREIGN PATENT DOCUMENTS

| | | |
|---|---|---|
| CN | 1369833 | 9/2002 |
| CN | 101295298 | 10/2008 |
| CN | 101707873 | 5/2010 |
| TW | 523681 | 3/2003 |
| TW | 588264 | 5/2004 |
| TW | I252993 | 4/2006 |

OTHER PUBLICATIONS

Chang et al. "A Chinese-to-Chinese Statistical Machine Translation Model for Mining Synonymous Simplified-Traditional Chinese Terms." Proceedings of Machine Translation Summit XI 2007.*
Halpern, Jack "The Role of Lexical Resources in CJK Natural Language Processing". Proc. of the 5th SIGHAN Workshop on Chinese Language Processing, pp. 64-71, 2006.*

(Continued)

*Primary Examiner* — Jesse Pullias
(74) *Attorney, Agent, or Firm* — Jianq Chyun IP Office (57) ABSTRACT

A text conversion method and a text conversion system are provided. A term mapping table recording a term mapping relationship between a source language and a target language is provided. A tokenization process is performed on a paragraph in the source language to obtain tokenization results. The tokenization results are compared with the term mapping table to determine each source language term in the paragraph is belonging to a first type or a second type. The source language terms belonging to the first type are converted into corresponding target language terms according to the term mapping table. Regarding each source language term of the second type, one of multiple corresponding candidate target language terms is selected as the target language term according to a co-occurrence relevance of relevant terms, wherein each relevant term is constituted by one candidate target language term and words before and after that in the paragraph.

14 Claims, 7 Drawing Sheets

(56) References Cited

OTHER PUBLICATIONS

Halpern, Jack, and Jouni Kerman. "Pitfalls and Complexities of Chinese to Chinese Conversion." International Unicode Conference (14th) in Boston. 1999.*

Ker, Sue J., and Chun-Hsien Lin. "An Alignment based technique for Text Translation between Traditional Chinese and Simplified Chinese." 2002.*

"Office Action of Taiwan Counterpart Application", issued on Jul. 4, 2013, p1-p7, in which the listed references were cited.

* cited by examiner

METHOD AND SYSTEM FOR CO-OCCURRENCE-BASED TEXT CONVERSION

CROSS-REFERENCE TO RELATED APPLICATION

This application claims the priority benefit of Taiwan application serial no. 99137801, filed on Nov. 3, 2010. The entirety the above-mentioned patent application is hereby incorporated by reference herein and made a part of specification.

BACKGROUND OF THE INVENTION

1. Field of the Invention

The invention generally relates to a text conversion method, and more particularly, to a text conversion method and a text conversion system that can handle the situation of one source language term corresponding to multiple target language terms.

2. Description of Related Art

In this era of global village, one can get information from all over the world. However, when information written in an unfamiliar language is received, the information has to be converted by using a language conversion tool (e.g. Google translation service, Microsoft Office Product).

An existing language conversion tool usually converts terms in a source language into terms in a target language by looking up the terms in a mapping table. However, distorted conversion results may be obtained if the mapping table does not reflect the semantic gaps and linguistic differences between different languages. Besides, a source language term may often be converted into multiple target language terms during the course of language conversion. Accordingly, some language conversion tools require the user to manually select the desired target language term since the language conversion tools themselves cannot make the selection automatically. In addition, some language conversion tools determine the target language term corresponding to a source language term based on the appearance frequency of the target language term. However, according to the statistics, the foregoing technique usually renders wrong target language terms and cannot produce language conversion results in high accuracy.

SUMMARY OF THE INVENTION

Accordingly, the invention is directed to a text conversion method suitable for automatically producing an optimal text conversion result for terms having a one-to-many mapping problem. More particularly, the text conversion method is suitable for the character-and-phrase-based text conversion.

The invention is also directed to a text conversion system that can process semantic gaps and linguistic differences between different languages and accordingly can increase text conversion accuracy.

The present invention provides a text conversion method for converting a paragraph in a source language into a target language, wherein the paragraph contains a plurality of source language terms. The text conversion method includes following steps. A term mapping table recording a term mapping relationship between the source language and the target language is provided. A tokenization process is performed on the paragraph to obtain a plurality of tokenization results. The tokenization results are compared with the term mapping table to determine that each of the source language terms is belonging to a first type or a second type, wherein each of the source language terms belonging to the first type is corresponding to a single target language term, and each of the source language terms belonging to the second type is corresponding to a plurality of candidate target language terms. In the paragraph, the source language terms belonging to the first type are converted into the corresponding target language terms according to the term mapping relationship recorded in the term mapping table. Regarding each of the source language terms belonging to the second type, one of the corresponding candidate target language terms is selected as the target language term of the source language term according to a co-occurrence relevance of a plurality of relevant terms, wherein each of the relevant terms is constituted by one of the candidate target language terms and at least one word before and after the candidate target language term in the paragraph.

The present invention also provides a text conversion system for converting a paragraph in a source language into a target language, wherein the paragraph contains a plurality of source language terms. The text conversion system includes a storage unit, a classification unit, a conversion unit, and an output unit. The storage unit stores a term mapping table, wherein the term mapping table records a term mapping relationship between the source language and the target language. The classification unit is coupled to the storage unit. The classification unit performs a tokenization process on the paragraph to obtain a plurality of tokenization results and compares the tokenization results with the term mapping table to determine that each of the source language terms is belonging to a first type or a second type, wherein each source language term belonging to the first type is corresponding to a single target language term, and each source language term belonging to the second type is corresponding to a plurality of candidate target language terms. The conversion unit is coupled to the storage unit and the classification unit. In the paragraph, the conversion unit converts the source language terms belonging to the first type into the corresponding target language terms according to the term mapping relationship recorded in the term mapping table, and regarding each of the source language terms belonging to the second type, one of the corresponding candidate target language terms is selected as the target language term of the source language term according to a co-occurrence relevance of a plurality of relevant terms, wherein each of the relevant terms is constituted by one of the candidate target language terms and at least one word before and after the candidate target language term in the paragraph. The output unit is coupled to the conversion unit, and which outputs the paragraph in the target language.

The present invention further provides a text conversion method for converting text between a source language and a target language. The text conversion method includes following steps. A source language term is obtained from a paragraph in the source language. A term mapping table recording a term mapping relationship between the source language and the target language is provided, and the source language term is corresponding to at least one candidate target language term. One of the at least one candidate target language term is selected as a target language term of the source language term according to a co-occurrence relevance of a plurality of relevant terms in a plurality of language data sources, wherein each of the relevant terms is constituted by one of the at least one candidate target language term and at least one word before and after the candidate target language term in the paragraph.

The present invention further provides a text conversion system for converting text between a source language and a target language. The text conversion system includes an input unit, a storage unit, a conversion unit, and an output unit. The input unit obtains a source language term from a paragraph in the source language. The storage unit is coupled to the input unit. The storage unit provides a term mapping table, wherein the term mapping table records a term mapping relationship between the source language and the target language, and the source language term is corresponding to at least one candidate target language term. The conversion unit is coupled to the input unit and the storage unit. The conversion unit selects one of the at least one candidate target language term as a target language term of the source language term according to a co-occurrence relevance of a plurality of relevant terms in a plurality of language data sources, wherein each of the relevant terms is constituted by one of the at least one candidate target language term and at least one word before and after the candidate target language term in the paragraph. The output unit is coupled to the conversion unit, and which outputs the paragraph in the target language.

As described above, in the present invention, when a paragraph is converted, regarding a source language term corresponding to multiple candidate target language terms, one of the candidate target language terms is selected as the desired target language term according to a co-occurrence relevance of a plurality of relevant terms, wherein each relevant term is constituted by one of the candidate target language terms and at least one word before and after the candidate target language term in the paragraph. Thereby, an optimal text conversion result can be obtained.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
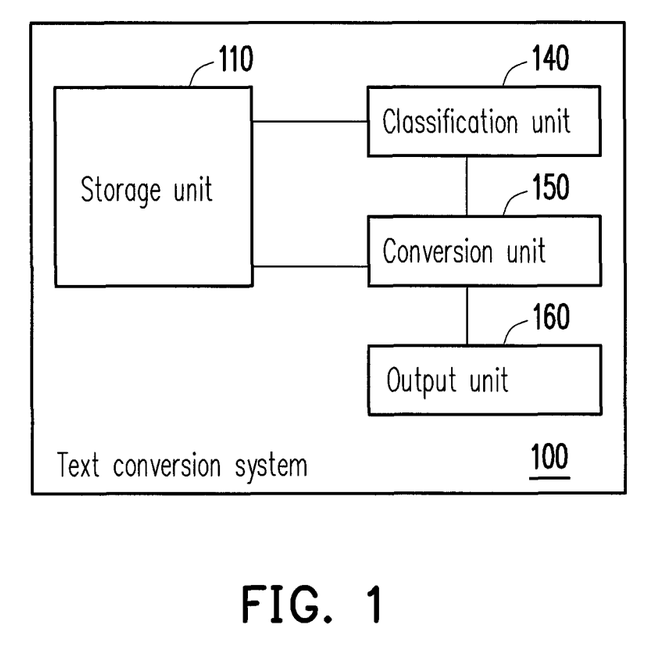
FIG. 1 is a block diagram of a text conversion system according to an embodiment of the invention.

FIG. 1 is a block diagram of a text conversion system according to an embodiment of the invention. Referring to FIG. 1, the text conversion system 100 includes a storage unit 110, a classification unit 140, a conversion unit 150, and an output unit 160. The text conversion system 100 may be implemented in a cell phone, a personal digital assistant (PDA), an e-book, a mobile internet device (MID), or different computers. Besides, the text conversion system 100 may also be embedded into a browser, a word processing software, or a web service.

The text conversion system 100 is, for example, a character-and-phrase-based text conversion system, for converting a paragraph from a source language into a target language. For example, the text conversion system 100 may convert a paragraph in simplified Chinese into a paragraph in traditional Chinese, converts a paragraph in traditional Chinese into a paragraph in simplified Chinese, converts a paragraph in English into a paragraph in Chinese, or converts a paragraph in Chinese into a paragraph in English, etc. In the invention, the types of the source language and the target language are not limited. The paragraph contains a plurality of source language terms, wherein each of the source language terms may be a word/character or a phrase composed of several words/characters in the source language.

The storage unit 110 may be a hard disk drive (HDD), a solid state drive (SSD), or a flash memory storage device. However, the type of the storage unit 110 is not limited herein. The storage unit 110 stores a term mapping table used in text conversion, wherein the term mapping table records a term mapping relationship between the source language and the target language.

The classification unit 140 is coupled to the storage unit 110. The classification unit 140 determines that each source language term in the paragraph is belonging to a first type or a second type according to the term mapping table recorded in the storage unit 110. Each source language term belonging to the first type is corresponding to a single target language term, and it should be mentioned herein that the length of the source language terms may not be equal to the length of the corresponding target language terms, wherein the length can be the word length or character length. Each source language term belonging to the second type is corresponding to a plurality of candidate target language terms.

The conversion unit 150 is coupled to the storage unit 110 and the classification unit 140. The conversion unit 150 converts the source language terms into target language terms through different techniques according to the determination result of the classification unit 140, so as to produce an optimal conversion result.

Figure 2:
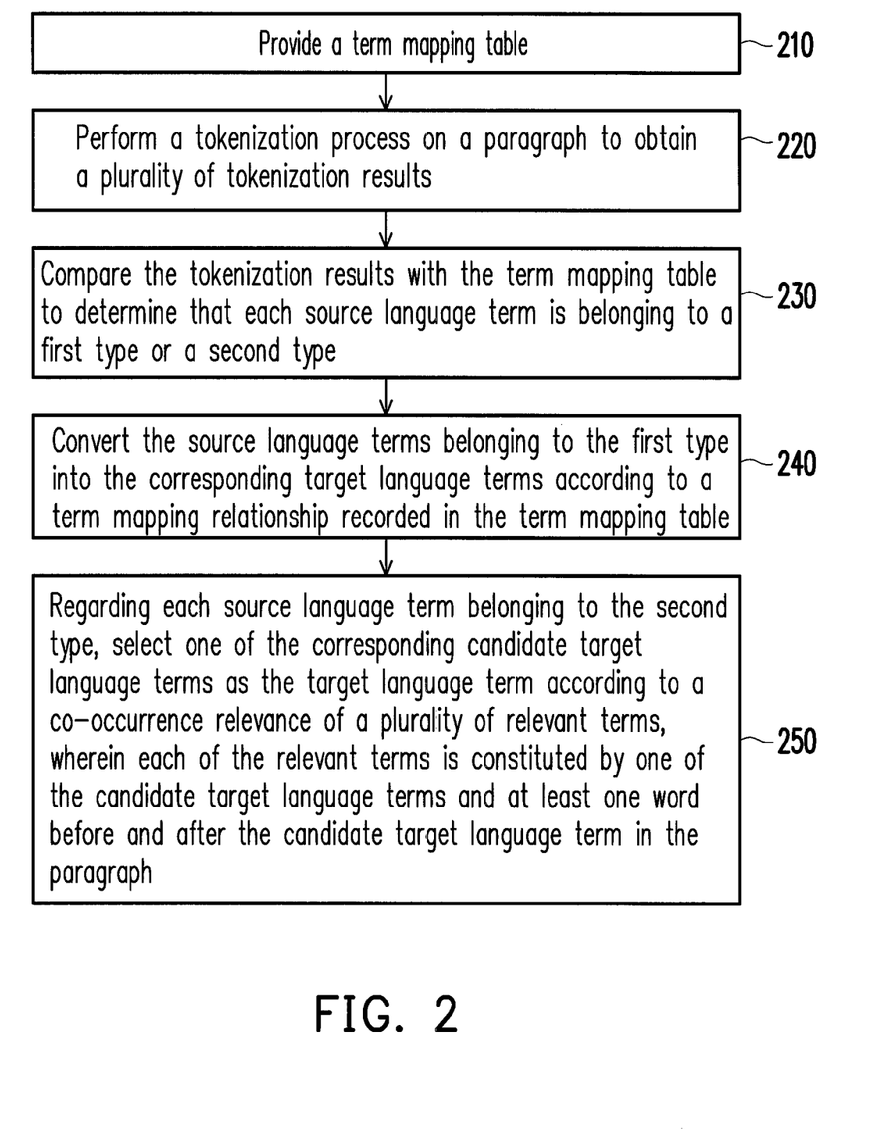
FIG. 2 is a flowchart of a text conversion method according to an embodiment of the invention.

Below, the operations of various units in the text conversion system 100 will be described in detail with reference to another embodiment of the invention. FIG. 2 is a flowchart of a text conversion method according to an embodiment of the invention. Please refer to both FIG. 1 and FIG. 2 for following description.

First, in step 210, a term mapping table recorded in the storage unit 110 is provided, wherein the term mapping table records a term mapping relationship between a source language and a target language. To be specific, the term mapping table records a plurality of terms (words/characters, or phrases composed of words/characters) in the source language and one or multiple target language terms (words/characters, or phrases composed of words/characters) corresponding to each of foregoing terms. It has to be noted that in the term mapping table, a term in the source language may not have the same length (e.g. the word length or character length) as the corresponding term in the target language. For example, assuming that the source language is simplified Chinese and the target language is traditional Chinese, in the term mapping table, the simplified Chinese term "西柚" ("grapefruit" in simplified Chinese, and the character length thereof is 2) is corresponding to the traditional Chinese term "葡萄柚" ("grapefruit" in traditional Chinese, and the character length thereof is 3), while the simplified Chinese term "公交车" ("bus" in simplified Chinese, and the character length thereof is 3) is corresponding to the traditional. Chinese term "公車" ("bus" in traditional Chinese, and the character length thereof is 2).

Then, in step 220, the classification unit 140 performs a tokenization process on the paragraph to obtain a plurality of tokenization results. In the present embodiment, the classification unit 140 may perform a bi-gram (or n-gram) tokenization process on the paragraph to mark off every two continuous characters (or every n continuous characters) in the paragraph into a tokenization result in which the punctuation is not included. However, the tokenization algorithm adopted by the classification unit 140 is not limited in the invention.

Next, in step 230, the classification unit 140 compares the tokenization results with the term mapping table in the storage unit 110 to determine that each source language term in the paragraph is belonging to a first type or a second type. To be specific, if a term completely or partially matching a source language term in the paragraph is found in the term mapping table and the term is corresponding to a single term in the target language, the source language terms is determined to belong to the first type. When it is based on a long term priority principle for finding the term completely or partially matching a source language term in the paragraph. When finding a term in the term mapping table that completely or partially matches a source language term in the paragraph, the classification unit 140 may follow the long term priority principle. For instance, after performing the bi-gram (or n-gram) tokenization process to obtain the tokenization results, when comparing each tokenization result with the term mapping table, the tokenization result corresponding to the longer term will be compared first. Consequently, it can be determined that whether a term consistent with the tokenization result which is presently compared exists in the term mapping table. If the term consistent with the tokenization result which is presently compared exists in the term mapping table, the classification unit 140 determines that the tokenization result which is presently compared is a term (i.e. a meaningful term). After comparing all of the tokenization results, the classification unit 140 takes apart the words in the paragraph to obtain a plurality of source language terms in accordance with the terms determined from the tokenization results. When taking apart the words in the paragraph, a longest term in the paragraph will be selected as a source language ten at first, and then a second longest term in the remaining terms in the paragraph will be selected as a source language term, and analogically for the rest until it remains only one word in the paragraph to be regarded as a source language term.

Thereafter, in step 240, the conversion unit 150 respectively converts all the source language terms in the paragraph that belong to the first type into the corresponding target language terms according to the term mapping relationship recorded in the term mapping table. To be specific, the conversion unit 150 can convert the source language terms belonging to the first type into the target language terms based on a long term priority principle.

Finally, in step 250, regarding each source language term belonging to the second type, the conversion unit 150 selects one of the corresponding candidate target language terms as the desired target language term according to a co-occurrence relevance of a plurality of relevant terms, wherein each of the relevant terms is constituted by one of the candidate target language terms and at least one word before and after the candidate target language term in the paragraph. The operation of the conversion unit 150 will be described in detail below with reference to accompanying drawings.

After the conversion unit 150 converts the source language terms into the corresponding target language terms through different techniques according to the types of the source language terms, the output unit 160 outputs the converted paragraph to be viewed by a user.

In following embodiment, it is assumed that the source language is simplified Chinese and the target language is traditional Chinese. Because less words are used in simplified Chinese than in traditional Chinese (i.e., a word in simplified Chinese may be corresponding to multiple words in traditional Chinese), while converting a paragraph in simplified Chinese into a paragraph in traditional Chinese, such situation that one term in simplified Chinese is corresponding to multiple terms in traditional Chinese may be produced. Herein it is assumed that the content of the paragraph to be converted by the text conversion system 100 is "这名博客在网志上面 写着，他爱人煮了 碗汤面给他吃" ("this blogger posted on the blog that his wife cooked a bowl of noodle soup for him to eat" in simplified Chinese).

First, the classification unit 140 performs a tokenization process on the paragraph. The tokenization results "这名", "名博", "博客", "客在", "在网", "网志", "志上", "上面", "面写", "写着", . . . , "碗汤", "汤面", "面给", "给他", and "他吃" are generated. Each of the tokenization results obtained by performing the tokenization process is constituted by two adjacent characters in the paragraph, and each tokenization result may be a meaningful term or a meaningless character-combinations. Each tokenization result has to be compared with the term mapping table in order to acquire a relative term. Consequently, the classification unit 140 compares these tokenization results with the term mapping table in the storage unit 110, so as to determine that among all the simplified Chinese terms in the paragraph, only the simplified Chinese term "面" ("noodle" or a preposition following "on" in simplified Chinese) belongs to the second type and all the other simplified Chinese terms belong to the first type. As the term mapping relationship recorded in the term mapping table shows, the simplified Chinese terms "这" ("this" in simplified Chinese), "名" (a quantifier following "this" in simplified Chinese), "博客" ("blogger" in simplified Chinese), "在" ("at" in simplified Chinese), "网志" ("blog" in simplified Chinese), "上" ("on" in simplified Chinese), "写" ("write" in simplified Chinese), "着" (an adverbial particle in simplified Chinese), "他" ("his" in simplified Chinese), ""爱人"" ("wife" in simplified Chinese), "'煮" ("cook" in simplified Chinese), "了" (an expletive in simplified Chinese), "碗" ("bowl" in simplified Chinese), "汤" ("soup" in simplified Chinese), "给" ("for" in simplified Chinese), and ""吃"" ("eat" in simplified Chinese) belonging to the first type are respectively corresponding to the traditional Chinese terms "'這'" ("this" in traditional Chinese), "名" (a quantifier following "this" in traditional Chinese), "'部落客" ("blogger" in traditional Chinese), "在" ("at" in traditional Chinese), ""部落格"" ("blog" in traditional Chinese), "上" ("on" in traditional Chinese), "'寫" ("write" in traditional Chinese), "著" (an adverbial particle in traditional Chinese), ""他"" ("his" in traditional Chinese), "老婆" ("wife" in traditional Chinese), "煮" ("cook" in traditional Chinese), "'了'" (an expletive in traditional Chinese), "'碗'" ("bowl" in traditional Chinese), "'湯'" ("soup" in traditional Chinese), "'給'" ("for" in traditional Chinese), and "'吃'" ("eat" in traditional Chinese). Thus, the conversion unit 150 directly converts the simplified Chinese terms belonging to the first type into the corresponding traditional Chinese terms according to foregoing term mapping relationship. However, because the simplified Chinese term "面" ("noodle" or a preposition following "on" in simplified Chinese) is corresponding to two candidate traditional Chinese terms "面" (a preposition following "on" in traditional Chinese) and "麵" ("noodle" in traditional Chinese), the conversion unit 150 respectively determines the co-occurrence relevance of a plurality of relevant terms, wherein each of the relevant terms is constituted by the candidate traditional Chinese term "面" and at least one word before and after the candidate traditional Chinese term "面" in the paragraph, and determines the co-occurrence relevance of each of a plurality of relevant terms, wherein each of the relevant terms is constituted by the candidate traditional Chinese term "麵" and the at least one word before and after the candidate traditional Chinese term "麵" in the paragraph, and then selects the desired traditional Chinese term from the candidate traditional Chinese terms "面" (a preposition following "on" in traditional Chinese) and "麵" ("noodle" in traditional Chinese) accordingly. In the present embodiment, the conversion result produced by the conversion unit 150 is "這名部落客在部落格上面寫著,他老婆煮了碗 湯麵給他吃" ("this blogger posted on the blog that his wife cooked a bowl of noodle soup for him to eat" in traditional Chinese).

In the embodiment described above, the conversion unit 150 first converts all the source language terms belonging to the first type. Then, regarding each source language term belonging to the second type, the conversion unit 150 selects a candidate target language term among all the candidate target language terms as the desired target language term according to the co-occurrence relevance of a plurality of relevant terms, wherein each of the relevant terms is constituted by the candidate target language term and at least one word before and after the candidate target language term in the paragraph.

Below, how the conversion unit 150 converts the source language terms belonging to the second type into appropriate target language terms will be described in detail with reference to FIG. 3. In the present embodiment, for each of the candidate target language terms, the conversion unit 150 calculates the co-occurrence relevance of the corresponding relevant terms by using a language model, wherein the language model may be an n-gram language model, a bi-gram language model, or any other lexical frequency mapping table for recording the mapping frequencies between terms.

For the convenience of description, below, those source language terms that are to be processed by the conversion unit 150 and belong to the second type are referred to as source language terms to be converted. Referring to FIG. 3, in step 310, for each of the candidate target language terms, the conversion unit 150 respectively calculates the co-occurrence relevance of a plurality of corresponding relevant terms, wherein each of the relevant terms is constituted by the candidate target language term corresponding to a source language term to be converted and at least one word before and after the candidate target language term in the paragraph by using a language model. To be specific, the conversion unit

150 obtains at least one word before and after the candidate target language term (for example, a previous word, a next word, previous two words, and next two words, etc) from the paragraph according to the position of the source language term to be converted, and uses the candidate target language term and the obtained words to constitute a plurality of relevant terms. For each candidate target language term, the conversion unit 150 calculates the co-occurrence relevance of the relevant terms by using the language model.

For example, it is assumed that the source language is simplified Chinese, the target language is traditional Chinese, the language model adopted by the conversion unit 150 is the n-gram language model, and the content of the paragraph is "這名部落客在部 落格上(面)寫著,他老婆煮了碗湯 (面)給他吃" ("this blogger posted on the blog that his wife cooked a bowl of noodle soup for him to eat" in traditional Chinese. The term in the parentheses is a traditional Chinese term for temporal conversion and needs to be confirmed). The simplified Chinese term "面" ("noodle" or a preposition following "on" in simplified Chinese) in the corresponding simplified Chinese paragraph is a term belonging to the second type, and the candidate target language terms corresponding to it are the traditional Chinese terms "面" (a preposition following "on" in traditional Chinese) and "麵" ("noodle" in traditional Chinese). When the conversion unit 150 is about to convert the term "面" ("noodle" or a preposition following "on" in simplified Chinese) in the first combination of parentheses into an appropriate target language term, according to the position of the term to be converted in the paragraph, the conversion unit 150 obtains at least one word before and after the candidate target language term in "這名部落客在部落格上" (a specific portion of the traditional Chinese paragraph including the words before the term to be converted, i.e., the term in the first combination of parentheses). Taking the candidate target language term "面" ("a preposition following "on" in traditional Chinese) as an example, it constitutes the relevant terms "上面" (constituted by the candidate target language term and the last word in the above-mentioned specific portion), "格上面" (constituted by the candidate target language term and the last two words in the above-mentioned specific portion), "落格上面" (constituted by the candidate target language term and the last three words in the above-mentioned specific portion), ..., "名部落客在部落格上面" (constituted by the candidate target language term and the last nine words in the above-mentioned specific portion), and "'這名部落 客在部落格上面" (constituted by the candidate target language term and all words in the above-mentioned specific portion) with foregoing obtained words before and after the candidate target language term. The conversion unit 150 determines the number of occurrences of the term "面" (the number of occurrences thereof is expressed as F(面)) in the language model and the number of occurrences of the relevant term "上面" (the number of occurrences thereof is expressed as F(上面)) in the language model. It should be mentioned that if the number obtained is 0, which means there is no corresponding relevant term in the language model, the conversion unit 150 sets the number to a predetermined value in order to avoid a calculation result of 0. In the language model, the occurrence probability of the relevant term "上面" is expressed as P(上面):

$$P(上面) = \frac{F(上面)}{F(面)}$$

After that, the conversion unit 150 determines the number of occurrences of the relevant term "格上面" (the number of occurrences thereof is expressed as F 格上 面 )) in the language model and calculates the occurrence probability of the relevant term "格上面" (the occurrence probability thereof is expressed as P(格上面)) in the language model by using following expression:

$$P(格上面) = \frac{F(格上面)}{F(面)}$$

As described above, the conversion unit 150 respectively calculates the occurrence probabilities of each of the relevant terms (i.e. P(上面), P(格上面), ..., P(名 部落客在部落格 上面), and P(這名部落客在部 落格上面)) and uses the product of these probabilities as the co-occurrence relevance of the relevant terms corresponding to the candidate target language term "㐭" (a preposition following "on" in traditional Chinese), wherein each of the relevant terms is constituted by the candidate target language term "㐭" (a preposition following "on" in traditional Chinese) and the words before and after the candidate target language term "㐭" (a preposition following "on" in traditional Chinese) in the paragraph.

Similarly, while calculating the co-occurrence relevance of the relevant terms corresponding to the candidate target language term "麵" ("noodle" in traditional Chinese), wherein each of the relevant terms is constituted by the candidate target language term "麵" ("noodle" in traditional Chinese) and the words before and after the candidate target language term "麵" ("noodle" in traditional Chinese) in the paragraph, the conversion unit 150 also calculates the occurrence probability of each of the relevant terms (i.e. P(上面), P(格上面), ..., P(名部落客在 部落格上麵), and P(這名部落客在 部落格上麵)) and uses the product of these probabilities as the co-occurrence relevance corresponding to the candidate target language term "麵" ("noodle" in traditional Chinese).

Next, in step 320, the conversion unit 150 selects one of the candidate target language term corresponding to the highest co-occurrence relevance as the target language term of the source language term. If, as described in foregoing embodiment, the co-occurrence relevance corresponding to the candidate target language term 㐭 (a preposition following "on" in traditional Chinese) is higher than the co-occurrence relevance corresponding to the candidate target language term 麵 ("noodle" in traditional Chinese), the conversion unit 150 selects the candidate target language term 㐭 (a preposition following "on" in traditional Chinese) as the target language term.

Finally, in step 330, the conversion unit 150 converts the source language term into the target language term in the paragraph.

In another embodiment, in order to increase the processing speed, for each candidate target language term, the conversion unit 150 may calculate the co-occurrence relevance between the relevant terms, in which each of the relevant terms is constituted by the candidate target language term and at least one word before and after the candidate target language term in the paragraph by using the bi-gram language model.

The paragraph of 部落客在部落格 落格上(面)寫著 他老婆煮 了碗湯(面) 給他吃" ("this blogger posted on the blog that his wife cooked a bowl of noodle soup for him to eat" in traditional Chinese. The term in the parentheses is a traditional Chinese term for temporal conversion which needs to be confirmed) will be taken as an example again, wherein the simplified Chinese term 面 in the corresponding simplified Chinese parentheses is a term belonging to the second type, and the corresponding candidate target language terms are the traditional Chinese terms 㐭 (a preposition following "on" in traditional Chinese) and 麵 ("noodle" in traditional Chinese). When the conversion unit 150 is about to convert the term 㐭 in the first combination of parentheses into an appropriate target language term, the conversion unit 150 first obtains the words before and after the term 㐭 among the terms "這名部 落客在部落格上" (a specific portion of the traditional Chinese paragraph including the Words before the term to be converted, i.e., the term in the first combination of parentheses). Then, the conversion unit 150 respectively calculates the probability of terms constituted by the candidate target language term and the last word in the above-mentioned specific portion (denoted by P(上面)), and the probabilities of every two adjacent words in the above-mentioned specific portion (the probabilities are denoted by P(格上), P(落格), P(部落), ..., P(名部), and P(這名), the method of calculating a probability is similar to that described in foregoing embodiment) and uses the product of these probabilities as the co-occurrence relevance corresponding to the candidate target language term 㐭 (a preposition following "on" in traditional Chinese). The conversion unit 150 also calculates the probability of terms constituted by the candidate target language term and the last word in the above-mentioned specific portion (denoted by P(上面)), and the probabilities of every two adjacent words in the above-mentioned specific portion (the probabilities are denoted by P(格上), P(落格), P(部落), ..., P(名部), and P(這名)) and uses the product of these probabilities as co-occurrence relevance corresponding to the candidate target language term 麵 ("noodle" in traditional Chinese). The conversion unit 150 determines which candidate target language term is selected as the target language term according to the two co-occurrence relevance corresponding to two candidate target language terms respectively.

Figure 3:
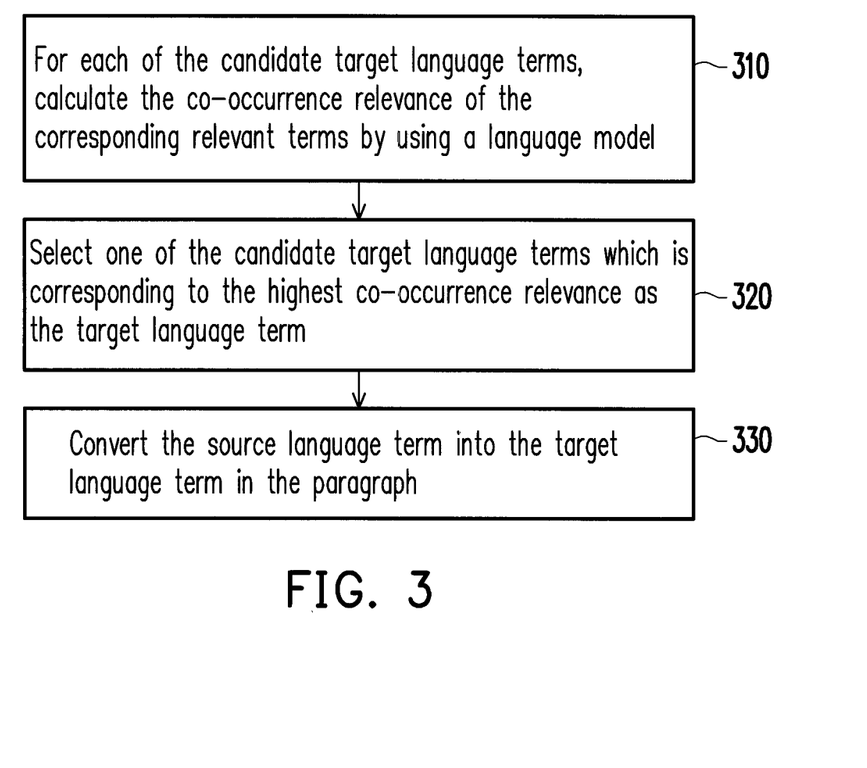
FIG. 3 is a flowchart illustrating how a source language term belonging to a second type is converted according to an embodiment of the invention.

Generally speaking, regarding a source language term in the paragraph that belong to the second type, the conversion unit 150 can select the desired target language term from a plurality of corresponding candidate target language terms through the steps illustrated in FIG. 3. However, if there is not enough related information in the language model, the co-occurrence relevance corresponding to different candidate target language terms may be too close to each other, and some candidate target language terms may even be corresponding to the same co-occurrence relevance. Accordingly, in another embodiment, the conversion unit 150 selects the desired target language term from a plurality of corresponding candidate target language terms through the steps illustrated in FIG. 4.

Figure 4:
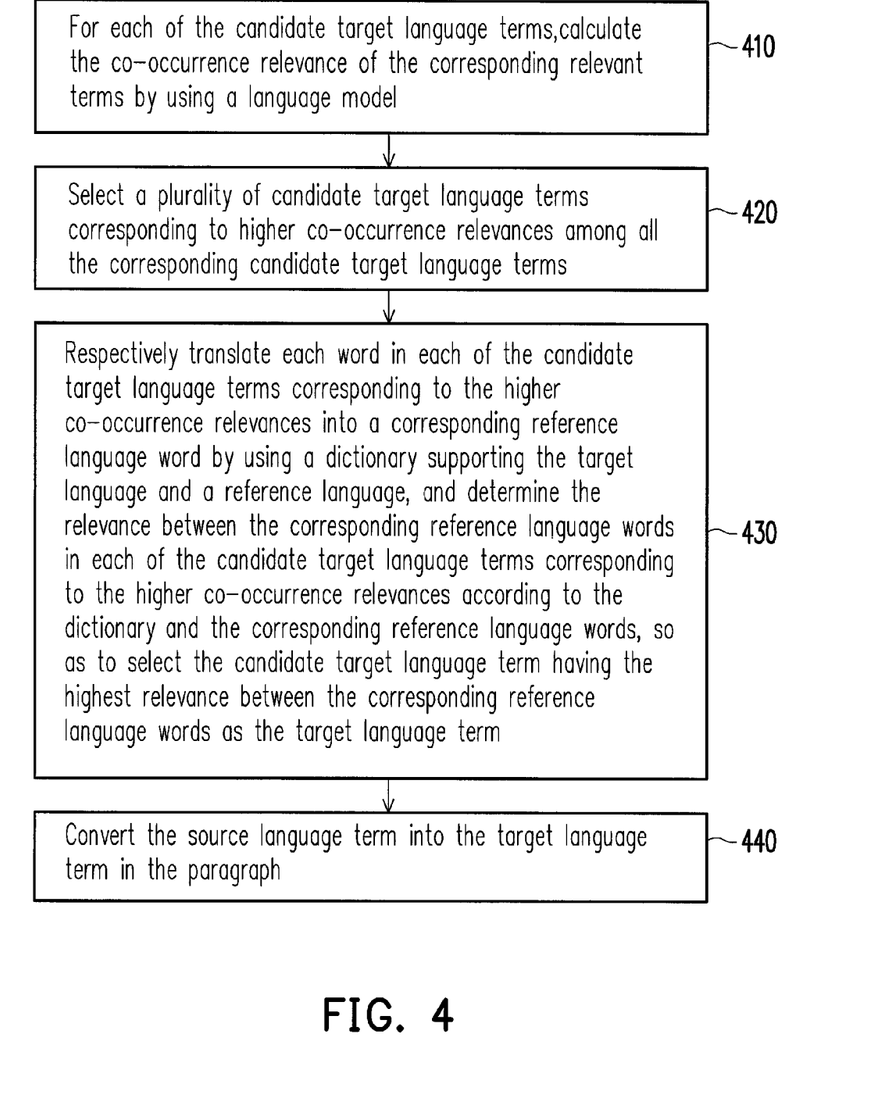
FIG. 4 is a flowchart illustrating how a source language term belonging to a second type is converted according to another embodiment of the invention.

Referring to FIG. 4, the step 410 is the same as or similar to the step 310 in FIG. 3 therefore will not be described herein.

In step 420, the conversion unit 150 selects a plurality of candidate target language terms corresponding to higher co-occurrence relevances among all the candidate target language terms corresponding to the source language term, wherein the co-occurrence relevance of each selected candidate target language term is higher than a first threshold. The first threshold may be any statistical value (for example, an average value or a former standard) of the co-occurrence relevances corresponding to all the candidate target language terms. Thus, when some candidate target language terms are corresponding to the same and highest co-occurrence relevance, these candidate target language terms are selected as the candidate target language terms corresponding to higher co-occurrence relevances. Or, when the co-occurrence relevances corresponding to some candidate target language terms are much higher than those of other candidate target language terms and the co-occurrence relevances corresponding to these candidate target language terms are close to each other (for example, smaller than a second threshold), these candidate target language terms are selected as the candidate target language terms corresponding to the higher co-occurrence relevances.

Then, in step 430, the conversion unit 150 respectively translates each word in each of the candidate target language terms corresponding to the higher co-occurrence relevances into a corresponding reference language word by using a dictionary supporting the target language and a reference language, and the conversion unit 150 determines the relevance between the corresponding reference language words in each of the candidate target language terms corresponding to the higher co-occurrence relevances according to the dictionary and the corresponding reference language words, so as to select the candidate target language term having the highest relevance between the corresponding reference language words as the target language term.

Finally, in step 440, the conversion unit 150 converts the source language term into the target language term in the paragraph.

For example, it is assumed that the source language is simplified Chinese, the target language is traditional Chinese, and the reference language is English. The paragraph of "但是她依舊昂然"自得地划動槳"" ("but she still paddles proudly and contentedly" in traditional Chinese. The term in the parentheses is a traditional Chinese term for temporal conversion which needs to be confirmed) will be taken as an example, wherein the term "划" ("paddle" or "scratch" in simplified Chinese) in the corresponding simplified Chinese paragraph is a term belonging to the second type, and the candidate target language terms corresponding to the source language term are "劃" ("scratch" in traditional Chinese) and "划" ("paddle" in traditional Chinese). The conversion unit 150 determines how to converts the paragraph into traditional Chinese through the steps illustrated in FIG. 4.

To be specific, in the present embodiment, the conversion unit 150 obtains the terms within n words before and after the source language term in the paragraph and forms the candidate target language terms corresponding to higher co-occurrence relevances by using each candidate target language term and foregoing obtained terms. For example, if n is equal to 3, the candidate target language terms corresponding to higher co-occurrence relevances are "自得地划動槳" (constituted by the candidate target language term "劃" and the terms within 3 words before and after the source language term in the paragraph) and "自得地划動槳" (constituted by the candidate target language term "划" and the terms within 3 words before and after the source language term in the paragraph).

The conversion unit 150 translates each word in the candidate target language term "自得地划動槳" (constituted by the candidate target language term "劃" and the terms within 3 words before and after the source language term in the paragraph) that is corresponding to a higher co-occurrence relevance into a corresponding reference language word by using a dictionary supporting traditional Chinese and English. For example, the conversion unit 150 translates the word "劃" ("scratch" in traditional Chinese) into corresponding reference language words "draw" and "scratch", translates the word "槳" ("oar" in traditional Chinese) into a corresponding reference language word "oar", and so on. Besides, the conversion unit 150 translates the word "划" ("paddle" in traditional Chinese) in the phrase "自得地划動槳" (constituted by the candidate target language term "划" and the terms within 3 words before and after the source language term in the paragraph) into a corresponding reference language word "paddle", translates the word "槳" ("oar" in traditional Chinese) into a corresponding reference language word "oar", and so on, by using the dictionary supporting traditional Chinese and English.

In an embodiment; the conversion unit 150 determines the relevance between the corresponding reference language words according to the appearance frequencies of each corresponding reference language word in a plurality of literal interpretations in the dictionary. For example, in the dictionary supporting traditional Chinese and English, the corresponding reference language word "paddle" appears in the literal interpretation of the corresponding reference language word "oar", but the corresponding reference language words "draw" and "scratch" do not appear in the literal interpretation of the corresponding reference language word "oar". Namely, the appearance frequency of the corresponding reference language word "paddle" in the literal interpretation of the corresponding reference language word "oar" is higher than the appearance frequencies of the corresponding reference language words "draw" and "scratch" in the literal interpretation of the corresponding reference language word "oar". Thus, the conversion unit 150 determines that the relevance between the corresponding reference language word "paddle" and the corresponding reference language word "oar" is higher than the relevance between the corresponding reference language words "draw" and "scratch" and the corresponding reference language word "oar". Accordingly, the conversion unit 150 converts the source language term "划" ("paddle" or "scratch" in simplified Chinese) into the target language term "划" ("paddle" in traditional Chinese) instead of the target language term "劃" ("scratch" in simplified Chinese) in the paragraph.

However, in another embodiment, conversion unit 150 may also calculate the semantic distance between the corresponding reference language words by using a semantic tree, so as to determine the relevance between the corresponding reference language words. Herein a shorter semantic distance indicates a higher relevance. The technique of calculating the semantic distance between two words by using a semantic tree is a well-known technique in the art therefore will not be described herein.

Figure 5:
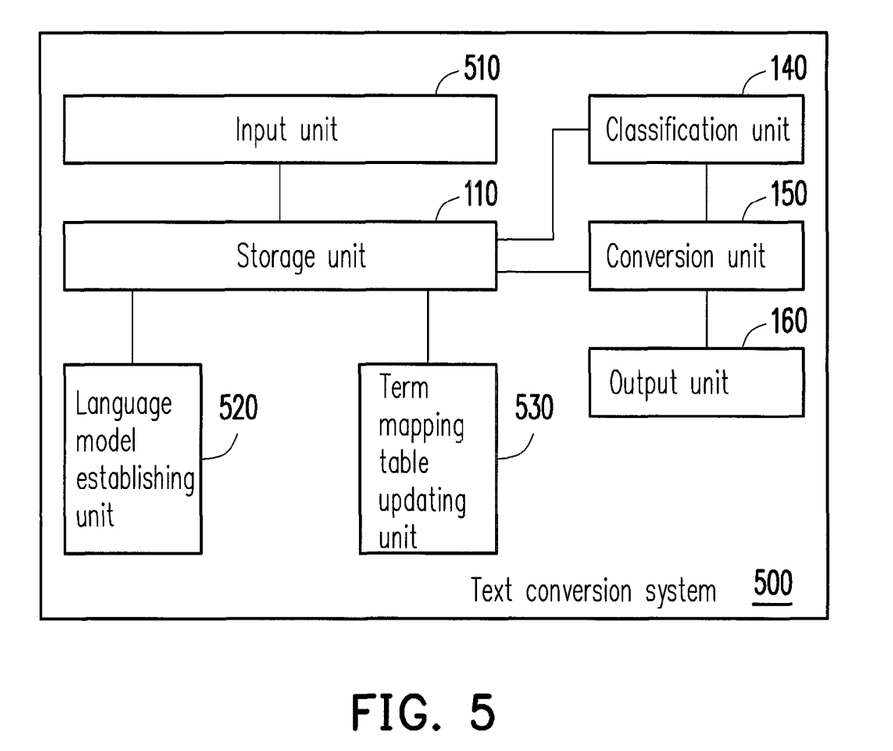
FIG. 5 is a block diagram of a text conversion system according to another embodiment of the invention.

FIG. 5 is a block diagram of a text conversion system according to another embodiment of the invention. As shown in FIG. 5, the text conversion system 500 includes a storage unit 110, a classification unit 140, a conversion unit 150, an output unit 160, an input unit 510, a language model establishing unit 520, and a term mapping table updating unit 530.

The storage unit 110, the classification unit 140, the conversion unit 150, and the output unit 160 have the same or similar functions as those in the text conversion system 100 illustrated in FIG. 1 therefore will not be described herein.

In the present embodiment, the input unit 510 is coupled to the storage unit 110 and is configured to receive a paragraph in a source language.

The language model establishing unit 520 is coupled to the storage unit 110. The storage unit 110 stores at least one corpus, wherein the corpus may be an existing parallel corpus or a parallel corpus generated by the text conversion system 500 through automated mining. The language model establishing unit 520 trains the corpus to establish a language model. For example, if the language model establishing unit 520 is about to establish a n-gram language model, the language model establishing unit 520 counts the texts in the corpus to generate term frequency information, estimates a probability expression of the n-gram language model through maximum likelihood estimation (MLE), and generate the n-gram language model according to the probability expression.

Because the language model establishing unit 520 establishes the language model based on the relevances between terms and their context terms, when the text conversion system 500 processes a conversion on the terms having a one-to-many mapping problem by using the language model, it can selects the term corresponding to a higher co-occurrence relevance, so that an appropriate text conversion result can be produced.

The term mapping table updating unit 530 is coupled to the storage unit 110. The term mapping table updating unit 530 automatically generates a parallel corpus corresponding to the source language and the target language by using the existing term mapping table in the storage unit 110 through web mining and updates the content of the term mapping table according to the parallel corpus.

To be specific, the term mapping table updating unit 530 obtains a source language data set and a target language data set through information retrieval and web mining, wherein the texts in a language data set may be terms, example sentences, paragraphs, article sections, or articles, etc. Then, the term mapping table updating unit 530 finds a source language text and a corresponding target language text respectively from the source language data set and the target language data set according to an existing traditional-to-simplified mapping table in the storage unit 110 and generates the parallel corpus by using the source language text and the target language text. For example, the term mapping table updating unit 530 obtains an article that describes a similar event respectively from the source language data set and the target language data set and selects two similar and probably aligned sentences from these two articles. Then, the term mapping table updating unit 530 calculates an alignment probability of these two articles by using these two sentences, so as to determine whether these two articles are high-quality aligned articles. If these two articles are high-quality aligned articles, foregoing two aligned sentences can be used as data in the parallel corpus. The term mapping table updating unit 530 generates the parallel corpus through the method described above and stores the parallel corpus in the storage unit 110.

Additionally, the term mapping table updating unit 530 expands the content of the term mapping table according to the parallel corpus. To be specific, the term mapping table updating unit 530 finds corresponding terms (for example, terms respectively in the source language and the target language and have differences are considered corresponding terms) from two example sentences stored in the parallel corpus that are aligned with each other and are respectively in the source language and the target language. If the corresponding terms are not in the term mapping table, the term mapping table updating unit 530 adds these corresponding terms into the term mapping table to expand the content of the term mapping table.

In an embodiment, assuming that the source language is simplified Chinese and the target language is traditional Chinese, if the simplified Chinese term "扎啤" ("draft beer" in simplified Chinese) and the traditional Chinese term "生啤酒" ("draft beer" in traditional Chinese) are corresponded to each other for at least a predetermined number (for example, 10) of times in the parallel corpus, the term mapping table updating unit 530 determines that the term "扎啤" ("draft beer" in simplified Chinese) and the term "生啤酒" ("draft beer" in traditional Chinese) are converted terms to each other. The term mapping table updating unit 530 establishes indexes (for example, inverted indexes) for such converted terms. Thus, the term mapping table updating unit 530 can update the content of the term mapping table or automatically establishes a new term mapping table according to the term mapping relationship and the indexes of the terms.

The term mapping table updated or established by the term mapping table updating unit 530 can reflect linguistic differences between the source language and the target language and can provide a term mapping relationship between terms having different numbers of words. Thereby, the text conversion system 500 can produce an optimal text conversion result.

In an embodiment of the invention, when the text conversion system 500 is implemented in a mobile device (for example, a cell phone, a PDA, or an e-book), due to the many limitations in the speed of the processor, the capacity of the memory, and the capacity of the storage space in the mobile device, the language model establishing unit 520 manages to reduce the quantity of data in the language model after it establishes the language model, so as to increase the conversion speed and improve the efficiency of the text conversion system 500.

For example, after the language model establishing unit 520 establishes the language model through the technique described above, it only reserves those sentences that contain terms with a one-to-many mapping problem on text conversions (more conversion errors may be produced in such sentences) and those sentences that contain terms having higher appearance frequencies.

Additionally, regarding each of the sentences that are retained, the language model establishing unit 520 captures essential segments in the sentence to further reduce the data quantity. In other words, the language model establishing unit 520 obtains a shorter sentence segment composed of n (for example, 3) words before and after a term having a higher appearance frequency or a word corresponding to multiple candidate target language terms and deletes terms not belonging aforementioned sentence segment. For example, if the language model contains traditional Chinese sentences like "現在他剛從六百(裡)外的煤礦回來" ("he just came back from a coal mine about six hundred kilometers away" in traditional Chinese. The term in the parentheses is a traditional Chinese term for temporal conversion which needs to be confirmed), wherein the term "裡" ("inside" in traditional Chinese) has a higher appearance frequency, the language model establishing unit 520 shortens the traditional Chinese sentence into "從六百裡外的煤" (constituted by the term "裡" having the higher appearance frequency and the six words within word distance of 3 before and after the higher appearance frequency term in the traditional Chinese sentences) in the language model.

Moreover, the language model establishing unit 520 may further convert the shortened language model into a binary file, so as to increase the processing speed of the language model.

Similarly, the term mapping table updating unit 530 processes the term mapping table by using a hash function, so as to shorten the time spent on comparing and searching the term mapping table.

Figure 6:
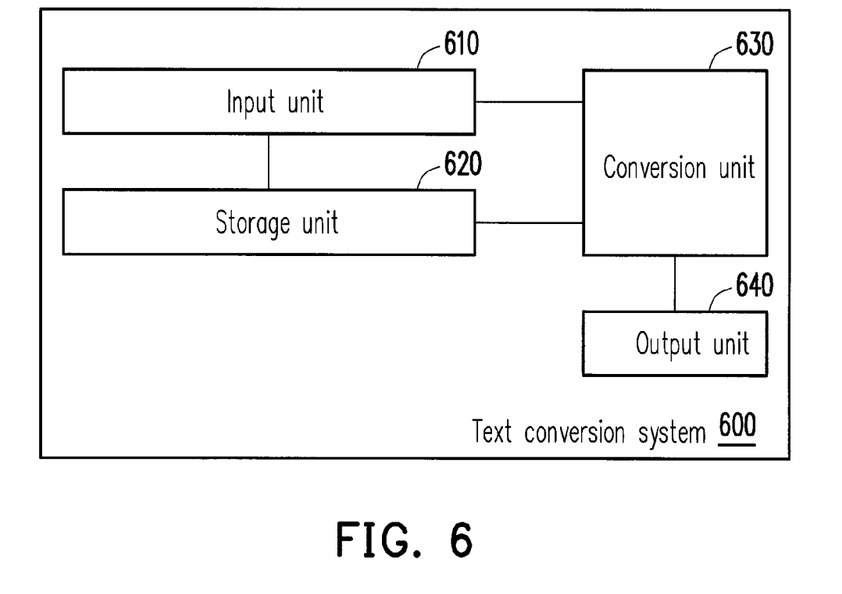
FIG. 6 is a block diagram of a text conversion system according to yet another embodiment of the invention.

FIG. 6 is a block diagram of a text conversion system according to yet another embodiment of the invention. Referring to FIG. 6, the text conversion system 600 includes an input unit 610, a storage unit 620, a conversion unit 630, and an output unit 640. The text conversion system 600 may be implemented in a cell phone, a PDA, an e-book, different computers, or a mobile Internet device. Or, the text conversion system 600 may also be embedded into a browser, a word processing software, or a web service. The text conversion system 600 converts a paragraph in a source language into a paragraph in a target language. Herein the types of the source language and the target language are not limited.

In the present embodiment, the input unit 610 obtains a source language term from the paragraph in the source language.

The storage unit 620 is coupled to the input unit 610. The storage unit 620 may be a hard disk drive (HDD), a solid state drive (SSD), or a flash memory storage device. The storage unit 620 provides a term mapping table, wherein the term mapping table records a term mapping relationship between the source language and the target language, and the source language term is corresponding to at least one candidate target language term. The term mapping table in the storage unit 620 is the same as or similar to the term mapping table in the storage unit 110 illustrated in FIG. 1 therefore will not be described herein.

The conversion unit 630 is coupled to the input unit 610, the storage unit 620, and the output unit 640. The conversion unit 630 determines how to convert the source language term in the paragraph into a target language term by referring to a plurality of language data sources. The output unit 640 outputs the paragraph in the target language.

In another embodiment, the text conversion system 600 further includes a communication unit (not shown). The communication unit is coupled to the conversion unit 630 and is configured to connect to the language data sources through a communication network.

Figure 7:
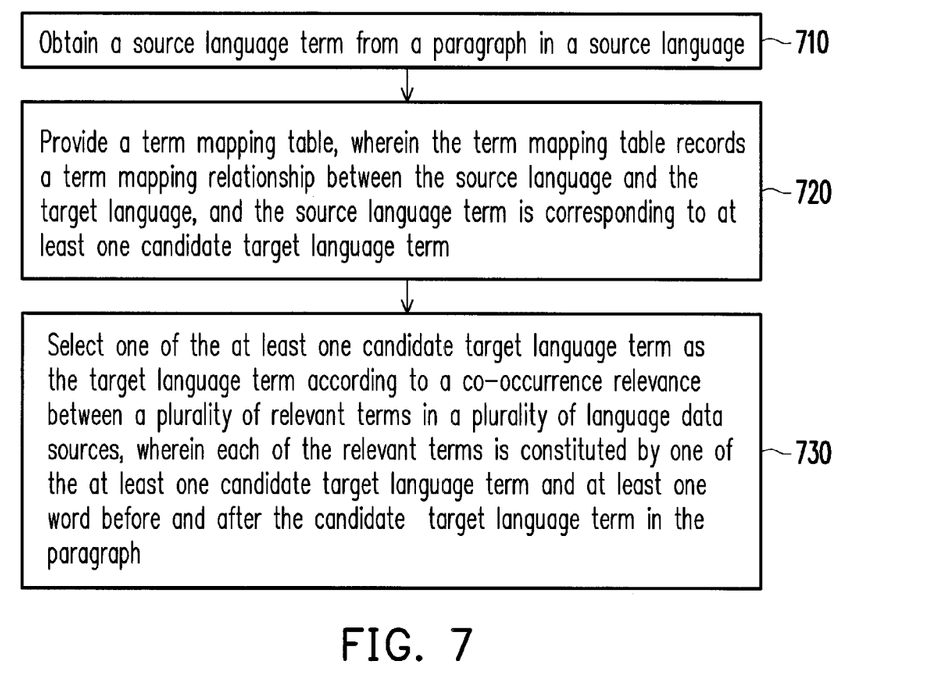
FIG. 7 is a flowchart of a text conversion method according to another embodiment of the invention.

Below, the operation of the text conversion system 600 will be described in detail with reference to FIG. 6 and FIG. 7.

First, in step 710, the input unit 610 obtains a source language term from a paragraph in a source language. Then, in step 720, a term mapping table recorded in the storage unit 620 is provided, wherein the term mapping table records a term mapping relationship between the source language and the target language, and the source language term is corresponding to at least one candidate target language term.

In step 730, the conversion unit 630 selects one of the at least one candidate target language terms as the target language term according to a co-occurrence relevance of a plurality of relevant terms in a plurality of language data sources, wherein each of the relevant terms is constituted by one of the at least one candidate target language term and at least one word before and after the candidate target language term in the paragraph.

The language data sources may be web pages, online articles, and language databases, etc. For each candidate target language term, the conversion unit 630 calculates the co-occurrence relevance of the relevant terms in the language data sources by using a language model, wherein each relevant term is constituted by the candidate target language term and at least one word before and after the candidate target language term in the paragraph. Herein the language model may be an n-gram language model, a bi-gram language model, or any lexical frequency mapping table recording for recording the mapping frequencies between terms. The type of the language model is not limited herein. The method of calculating the co-occurrence relevances is similar to that described in foregoing embodiment therefore will not be described herein.

In another embodiment, the conversion unit 630 calculates the co-occurrence relevance of a plurality of relevant terms respectively in a plurality of language data sources (web pages, online articles, and language databases, etc) by respectively counting the appearance numbers or frequencies of the relevant terms in the language data sources through a search engine or a search interface, and the conversion unit 630 selects the relevant term having a higher appearance count/frequency as the desired target language term.

The conversion unit 630 selects the candidate target language term corresponding to the highest co-occurrence relevance among all the candidate target language terms as the target language term, and the conversion unit 630 converts the source language term into the target language term in the paragraph. The output unit 640 then outputs the paragraph in the target language.

As described above, after the text conversion system 600 receives the paragraph in the source language, it searches for a large quantity of language data sources (for example, related web pages, online articles, and language databases, etc) on the Internet and then determines how to select one of the candidate target language terms corresponding to the source language term as the desired target language term accordingly, so as to produce an optimal text conversion result.

It should be noted that even though the source language is assumed to be simplified Chinese and the target language is assumed to be traditional Chinese in foregoing embodiments, the present invention is not limited thereto, and in other embodiments, the source language may also be traditional Chinese while the target language may also be simplified Chinese. Or, it may also be that the source language is Chinese while the target language is English. In the present invention, the types of the source language and the target language are not limited.

In summary, the present invention provides a text conversion method and a text conversion system, wherein when a paragraph is converted from a source language into a target language, linguistic differences between different languages can be automatically processed, and regarding such situation that one source language term is corresponding to multiple candidate target language terms, the most appropriate target language term can be automatically selected among the candidate target language terms according to the co-occurrence relevance of a plurality of relevant terms, wherein each of the relevant terms is constituted by the candidate target language term and at least one word before and after the candidate target language term in the paragraph. Thereby, the accuracy in text conversion can be greatly improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A text conversion method for converting a paragraph in a source language into a target language, adapted to an electronic device having a processor, wherein the paragraph comprises a plurality of source language terms, the text conversion method comprising:

providing a term mapping table by the processor, wherein the term mapping table records a term mapping relationship between the source language and the target language;

performing a tokenization process on the paragraph by the processor to obtain a plurality of tokenization results;

comparing the tokenization results with the term mapping table by the processor to determine that each of the source language terms is belonging to a first type or a second type, wherein each of the source language terms belonging to the first type is corresponding to a single target language term, and each of the source language terms belonging to the second type is corresponding to a plurality of candidate target language terms;

converting the source language terms belonging to the first type into the corresponding target language terms by the processor according to the term mapping relationship recorded in the term mapping table;

regarding each of the source language terms belonging to the second type, calculating a co-occurrence relevance of a plurality of relevant terms corresponding to each of the candidate target language terms by using a language model by the processor, wherein each of the relevant terms is constituted by one of the candidate target language terms and at least one word before and after the candidate target language term in the paragraph;

selecting a plurality of candidate language terms corresponding to higher ones of the co-occurrence relevance among the candidate target language terms by the processor, wherein each co-occurrence relevance corresponding to one of the selected candidate target language terms is higher than a first threshold;

respectively translating each word in each of the selected candidate target language terms into a corresponding reference language word by using a dictionary supporting the target language and a reference language by the processor;

determining a relevance between the corresponding reference language words in each of the selected candidate target language terms according to the dictionary and the corresponding reference language words by the processor, so as to select the candidate target language term having the highest relevance between the corresponding reference language words as the target language term; and converting the source language term into the target language term in the paragraph by the processor.

2. The text conversion method according to claim 1, wherein the step of determining the relevance between the corresponding reference language words comprises:

determining the relevance between the corresponding reference language words according to an appearance frequency of each of the corresponding reference language words in a plurality of literal interpretations in the dictionary.

3. The text conversion method according to claim 1 further comprising:

establishing the language model by training at least one corpus.

4. The text conversion method according to claim 1 further comprising:

obtaining a source language data set and a target language data set through information retrieval and web mining;

finding a source language text and a corresponding target language text respectively from the source language data set and the target language data set;

generating a parallel corpus by using the source language text and the corresponding target language text; and expanding a content of the term mapping table according to the parallel corpus.

5. A text conversion system for converting a paragraph in a source language into a target language, wherein the paragraph comprises a plurality of source language terms, the text conversion system comprising:

a storage unit, for storing a term mapping table, wherein the term mapping table records a term mapping relationship between the source language and the target language;

a classification unit, coupled to the storage unit, for performing a tokenization process on the paragraph to obtain a plurality of tokenization results and comparing the tokenization results with the term mapping table to determine that each of the source language terms is belonging to a first type or a second type, wherein each of the source language terms belonging to the first type is corresponding to a single target language term, and each of the source language terms belonging to the second type is corresponding to a plurality of candidate target language terms;

a conversion unit, coupled to the storage unit and the classification unit, for converting the source language terms belonging to the first type into the corresponding target language terms according to the term mapping relationship recorded in the term mapping table, and regarding each of the source language terms belonging to the second type, calculating a co-occurrence relevance of a plurality of relevant terms corresponding to each of the candidate target language terms by using a language model, selecting a plurality of candidate language terms corresponding to higher ones of the co-occurrence relevance among the candidate target language terms, respectively translating each word in each of the selected candidate target language terms into a corresponding reference language word by using a dictionary supporting the target language and a reference language, and determining a relevance between the corresponding reference language words in each of the selected candidate target language terms according to the dictionary and the corresponding reference language words by the processor, so as to select the candidate target language term having the highest relevance between the corresponding reference language words as the target language term, and converting the source language term into the target language term in the paragraph, wherein each of the relevant terms is constituted by one of the candidate target language terms and at least one word before and after the candidate target language term in the paragraph, and wherein each co-occurrence relevance corresponding to one of the selected candidate target language terms is higher than a first threshold; and an output unit, coupled to the conversion unit, for outputting the paragraph in the target language.

6. The text conversion system according to claim 5 further comprising:

an input unit, coupled to the storage unit, for receiving the paragraph in the source language.

7. The text conversion system according to claim 5, wherein the conversion unit further determines the relevance between the corresponding reference language words according to an appearance frequency of each of the corresponding reference language words in a plurality of literal interpretations in the dictionary.

8. The text conversion system according to claim 5, wherein the storage unit further stores at least one corpus, and the text conversion system further comprises a language model establishing unit coupled to the storage unit, wherein the language model establishing unit establishes the language model by training the at least one corpus.

9. The text conversion system according to claim 5 further comprising:
  a term mapping table updating unit, coupled to the storage unit, for obtaining a source language data set and a target language data set through information retrieval and web mining, finding a source language text and a corresponding target language text respectively from the source language data set and the target language data set, generating a parallel corpus by using the source language text and the corresponding target language text, and expanding a content of the term mapping table according to the parallel corpus.

10. A text conversion method for converting text between a source language and a target language, adapted to an electronic device having a processor, the text conversion method comprising:
  obtaining a source language term from a paragraph in the source language by the processor;
  providing a term mapping table by the processor, wherein the term mapping table records a term mapping relationship between the source language and the target language, and the source language term is corresponding to at least one candidate target language term; and
  calculating a co-occurrence relevance of a plurality of relevant terms corresponding to each of the at least one candidate target language term by using a language model by the processor, wherein each of the relevant terms is constituted by one of the at least one candidate target language term and at least one word before and after the candidate target language term in the paragraph;
  selecting a plurality of candidate language terms corresponding to higher ones of the co-occurrence relevance among the at least one candidate target language terms by the processor, wherein each co-occurrence relevance corresponding to one of the selected candidate target language terms is higher than a first threshold;
  respectively translating each word in each of the selected candidate target language terms into a corresponding reference language word by using a dictionary supporting the target language and a reference language by the processor;
  determining a relevance between the corresponding reference language words in each of the selected candidate target language terms by the processor according to the dictionary and the corresponding reference language words by the processor, so as to select the candidate target language term having the highest relevance between the corresponding reference language words as the target language term; and
  converting the source language term into the target language term in the paragraph.

11. The text conversion method according to claim 10, wherein the language data sources comprise web pages, online articles, and language databases.

12. A text conversion system, for converting text between a source language and a target language, the text conversion system comprising:
  an input unit, for obtaining a source language term from a paragraph in the source language;
  a storage unit, coupled to the input unit, for providing a term mapping table, wherein the term mapping table records a term mapping relationship between the source language and the target language, and the source language term is corresponding to at least one candidate target language term;
  a conversion unit, coupled to the input unit and the storage unit, for calculating a co-occurrence relevance of a plurality of relevant terms corresponding to each of the at least one candidate target language term by using a language model, selecting a plurality of candidate language terms corresponding to higher ones of the co-occurrence relevance among the at least one candidate target language terms, respectively translating each word in each of the selected candidate target language terms into a corresponding reference language word by using a dictionary supporting the target language and a reference language, determining a relevance between the corresponding reference language words in each of the selected candidate target language terms by the processor according to the dictionary and the corresponding reference language words by the processor, so as to select the candidate target language term having the highest relevance between the corresponding reference language words as the target language term, and converting the source language term into the target language term in the paragraph, wherein each of the relevant terms is constituted by one of the at least one candidate target language term and at least one word before and after the candidate target language term in the paragraph, and wherein each co-occurrence relevance corresponding to one of the selected candidate target language terms is higher than a first threshold; and
  an output unit, coupled to the conversion unit, for outputting the paragraph in the target language.

13. The text conversion system according to claim 12, wherein the language data sources comprise web pages, online articles, and language databases.

14. The text conversion system according to claim 12 further comprising a communication unit coupled to the conversion unit, wherein the communication unit is configured to connect to the language data sources through a communication network.

* * * * *